(12) United States Patent
Holmenlund

(10) Patent No.: US 7,607,258 B2
(45) Date of Patent: Oct. 27, 2009

(54) METHOD AND ENVIRONMENT FOR GROWING PLANTS

(75) Inventor: Niels Holmenlund, Hvidovre (DK)

(73) Assignee: Rockwool International A/S, Hedehusene (DK)

( * ) Notice: Subject to any disclaimer, the term of this patent is extended or adjusted under 35 U.S.C. 154(b) by 457 days.

(21) Appl. No.: 10/524,713

(22) PCT Filed: Aug. 15, 2003

(86) PCT No.: PCT/EP03/09067

§ 371 (c)(1),
(2), (4) Date: Mar. 21, 2005

(87) PCT Pub. No.: WO2004/017718

PCT Pub. Date: Mar. 4, 2004

(65) Prior Publication Data

US 2006/0117658 A1    Jun. 8, 2006

(30) Foreign Application Priority Data

Aug. 15, 2002   (GB)  ................. 0219062.7

(51) Int. Cl.
*A01G 9/10* (2006.01)
*A01G 31/00* (2006.01)
*A01G 23/10* (2006.01)
*C05D 9/00* (2006.01)
*C09K 9/00* (2006.01)

(52) U.S. Cl. .................. 47/58.1 SC; 47/64; 47/59 S
(58) Field of Classification Search .............. 47/64, 47/59 S, 52 E
See application file for complete search history.

(56) References Cited

U.S. PATENT DOCUMENTS 4,850,134 A * 7/1989 Snekkenes .................. 47/18

(Continued)

FOREIGN PATENT DOCUMENTS

DE         100 03 837 A1   10/2000

(Continued)

OTHER PUBLICATIONS

R. Roeber, et al.; "Influence of Drought Stress, DIF, and Growth Retardent on Yield and Quality of Dendranthema x grandiflorum"; Workshop on Environmental Regulation of Plant Morphogenesis; International Society for Horticultural Science; No. 378; Feb. 1995; pp. 139-148.

(Continued)

*Primary Examiner*—Rob Swiatek
*Assistant Examiner*—Kristen C Hayes
(74) *Attorney, Agent, or Firm*—Dickstein Shapiro LLP

(57) ABSTRACT

The invention provides a method of growing at least one plant (1), preferably a large number of plants, in which a plant is positioned for growth in a first growth substrate (2) which has a first water uptake capacity and a first sinking time S1, and the first growth substrate (2) is in fluid communication with a discrete second substrate (4) is mineral wool of density 40 to 100 kg/m² and which has a second water uptake capacity which is less than the first water uptake capacity and a second sinking time S2 and the value of S1 is greater than the value of S2, and during growth the second substrate is flooded with water at intervals. Preferably growth is under conditions of drought stress and/or nutrient stress. The invention also provides a plant growth environment such as a filled pot (3) comprising the first and second substrates in fluid 20 communication.

16 Claims, 1 Drawing Sheet

U.S. PATENT DOCUMENTS

| | | | |
|---|---|---|---|
| 5,035,080 A * | 7/1991 | Kafka | 47/59 R |
| 5,133,151 A * | 7/1992 | Blok | 47/64 |
| 5,218,783 A * | 6/1993 | Langezaal et al. | 47/64 |
| 7,104,006 B1 * | 9/2006 | Blaakmeer et al. | 47/59 S |
| 2006/0207170 A1 * | 9/2006 | Smith | 47/56 |

FOREIGN PATENT DOCUMENTS

| | | |
|---|---|---|
| EP | 425005 A2 * | 5/1991 |
| EP | 1 044 599 A1 | 10/2000 |
| FR | 2 599 934 | 12/1987 |
| FR | 2 641 938 A1 | 7/1990 |
| WO | WO 9213441 A1 * | 8/1992 |
| WO | WO-96/03030 | 2/1996 |
| WO | WO-03/022038 A1 | 3/2003 |

OTHER PUBLICATIONS

Michelle H. Williams, et al.; The effect of reducing production water availability on the post-production quality of potted miniature roses (Rosa x hybrida); Postharvest Biology and Technology 18 (2000); pp. 143-150.

* cited by examiner

METHOD AND ENVIRONMENT FOR GROWING PLANTS

This invention relates to methods for growing plants, in particular under conditions of drought stress and/or other nutrient stress, and to the use of these methods in improving the fullness and compactness of pot plants without the use of growth hormones and to the use of such methods for improving resistance of pot plants to water and other nutrient deficit.

It is well known to grow pot plants in peat as a growth substrate. Mineral wool is also known as a growth substrate for pot plants but is generally considered less economical, in particular because it is common to grow many hundreds and even thousands of the same type of plant at one time.

Mineral wool growth substrates have the advantage that they hold large amounts of water which is easily accessible to the plants. However, drying out of the substrate tends to occur very rapidly over a period of time which is insufficient to allow the plant to adapt to the dryness of the substrate, thus producing a high risk of wilting. Therefore when substrates based only on mineral wool are used water management by the grower is particularly important and must be controlled more closely than for peat or soil growth substrates.

It is desirable to ensure that the plant which is grown and subsequently sent on for sale has a full and compact shape. At present it is common to supply growth retardant additives such as hormones to the plant during growth in order to achieve this effect. However, this is generally felt to be environmentally undesirable; for instance if the plants are to be planted in a garden then there is potential for the additives to be transferred into the environment it has the further disadvantage that the growth retardant additives remain in the plant after sale (some for as long as five years or more) and have the effect that growth is retarded then also.

It would also be desirable to provide plants which are resistant to water deficit and, desirably, resistant to deficit of other nutrients, after initial sale. This is particularly advantageous for pot plants which are sold in, for instance, supermarkets, where they may remain for up to two weeks before sale to the final customer, and where an appropriate watering and nutrition strategy may not be in place.

It is known that the growth of plants under conditions of drought stress may be used as an alternative to growth retardant additives to regulate growth and plant structure. This is discussed in for instance "Workshop on Environmental Regulation of Plant Morphogenesis", International Society for Horticultural Science, no. 378, February 1995, editors L. Hendricks and E. Ueber, reporting proceedings in Hanover, Germany, the relevant paper being "Influence of Drought Stress, DIF and growth retardant on yield and quality of *Dendranthema* x *grandiflorum*", R. Roeber et al. This reference addresses the use of drought stress to replace growth retardants.

This effect is also discussed in "The effect of reducing production water availability on the post-production quality of potted miniature roses (*rosa* x *hybrida*)", Michelle H. Williams et al, Postharvest Biology and Technology 18 (2000) 143-150. This publication concentrates, on the use of drought stress to acclimatise rose plants to subsequent water deficit conditions.

However, it has been found to be difficult to subject pot plants grown in growth substrates such as peat to drought stress growth conditions, due to the properties of the peat. Growth under drought stress involves flooding the growth substrate with water for a short period of time and then not supplying water for a predetermined time after the water level falls below the requirements of the plant. With substrates such as peat it is difficult, if not impossible, to effect such conditions if the peat is allowed to dry out significantly. This is because dry peat is hydrophobic and thus very difficult to rewet and this difficulty increases as the dryness of the peat increases. Thus after the peat has been allowed to dry out the subsequent flooding stage cannot effectively rewet the peat.

This is a problem for any individual plant but causes particular difficulties in commercial practice where large numbers of different pot plants are grown under the same system. Each individual plant will use water at different rates. Thus when flooding is due to occur, the peat in some pots will be drier than the peat in other pots. The low hydrophilicity of dry peat, becoming lower as the peat becomes drier, means that pots with drier peat will take up less water during the flooding stage than the pots with less dry peat. This has the consequence of exaggerating any differences in water content with each flooding and plant growth is therefore not uniform throughout a batch. Any inhomogeneities in the growth substrate will intensify this effect.

It would be desirable to provide a system in which drought stress can effectively be applied to plants grown in a growth substrate having a low degree of hydrophilicity when dry, such as peat, and thus enable effective application of drought stress. It would be particularly desirable to provide a system which could be applied to large numbers of pot plants uniformly.

It would also be desirable to provide a system in which application of water can be controlled effectively for a large number of pot plants in a uniform manner. In particular it would be desirable to provide a system which enables controlling cyclic application of water to a large number of plants in a uniform manner.

Systems which are intended for growing plants under drought stress conditions are described in WO03/022036 and in WO03/022038.

In this specification we describe a method of growing at least one plant in which a plant is positioned for growth in a first growth substrate which has a first water uptake capacity and a first sinking time S1, and the first growth substrate is in fluid communication with a discrete second substrate which has a second water uptake capacity which is less than the first water uptake capacity (defined below) and a second sinking time S2 and the value of S1 is greater than the value of S2, and during growth the second substrate is flooded with water at intervals.

We also describe a plant growth environment, such as a filled pot, comprising a first growth substrate which has a first water uptake capacity and a first sinking time S1, and the first growth substrate is in fluid communication with a discrete second substrate which has a second water uptake capacity which is less than the first water uptake capacity and a second sinking time S2 and the value of S1 is greater than the value of S2.

Preferably the two substrates are contained in a plant growth container such as a pot. The system is adapted so that plants may be positioned for growth in the first growth substrate.

Preferably the at least one plant is grown under conditions of drought stress.

Thus the second substrate has a sinking time which is less than that of the first growth substrate. Sinking time (measurement discussed below) is a measure of the hydrophilicity of the substrate, where a lower sinking time value represents a greater hydrophilicity value. Thus the second substrate preferably has a degree of hydrophilicity when dry which is greater than that of the first growth substrate, which is preferably peat or coir. When the plant is grown, for instance under conditions of drought stress the flooding is applied to the second substrate. Because of the higher hydrophilicity of the second substrate, it takes up water rapidly during the flooding stage.

This has the further advantage that if large numbers of pot plants are grown in the same way, then uniform amounts of water are taken up by each second substrate during the flooding stage, thus ensuring that each plant receives substantially the same level of water during each flooding step.

Due to the higher water uptake capacity (measurement discussed below) of the first growth substrate, water moves into that from the second substrate after the flooding stage. Thus the invention allows the application of drought or nutrient stress to pot plants and can reduce or even in some cases eliminate the use of growth retardant additives such as hormones. Furthermore, it allows the production on a commercial scale of pot plants which have improved resistance to water deficit. In general, it allows controlled cyclic application of water in a uniform manner to a large number of plants. In particular it is possible to apply active water management to a large number of plants since re-wetting after drying out is effected in a controlled manner. This also allows close control of addition of nutrients.

The difference between the water uptake capacities of the first growth substrate and the second substrate has the further advantage of improving root pruning during growth.

Various publications have disclosed growth of pot plants in a pot containing more than one growth substrate, but none of these has described application of such systems to processes of growing under conditions in which the plants are flooded with water at intervals. In particular none has suggested the particular benefits which arise in processes of growing under drought stress.

For instance FR-A-2599934 discloses a pot plant growing in a pot having in the base a water-retaining material, preferably a block of polyester foam, covered with an equal volume of drainage material, preferably clay or terracotta, covered with compost in which the base of the plant is situated. The roots extend into the drainage material and water-retaining material. No mention is made of the relative hydrophilicity or water uptake capacity values of the three substrates.

EP-A-165,112 describes pot plants grown with the aid of water retainers which are crystals in a bag or sachet placed in the base of the pot and covered with soil. It appears that the aim is to ensure that the plant has adequate water at all times even when watering is infrequent. There is no disclosure of the relative hydrophilicity or water uptake capacity values of the soil and water retainer crystals.

WO00/05939 describes a plant pot comprising a first upper space separated from a second lower space by a porous plate, and a third space surrounding the second space. The second space accommodates a moisture-retaining, hydrating but air-permeable material. The aim is to prevent roots which grow through the porous plate from succumbing to root rot. An advantage of the pot described is said to be that it minimises shortage of moisture for the plant.

The method is preferably practised on pot plants grown in individual pots containing the first growth substrate. The invention will be discussed below in these terms, but it will be seen that it is applicable to growth of plants other than in pots.

Preferably the method is practised on at least 10, preferably at least 100 and in some cases at least 500 or even at least 1,000 plants simultaneously. Generally each plant is provided in a separate pot.

The plant is positioned for growth in a first growth substrate. That is, the base of the stem of the plant is in the first growth substrate. The first growth substrate is in fluid communication with a second substrate, generally also a material usable as a growth substrate.

The first growth substrate has a water uptake capacity which is generally relatively high.

Determination of the relative water uptake capacities of the first and second substrate is carried out as follows.

A first cylinder is provided having diameter 10 cm and height 1 cm. The first cylinder has an open top end and a base which does not prevent water drainage but which holds any substrate placed on it. In particular it can be a metal mesh. Sufficient of the dry second substrate is provided to fill the cylinder. The mass of this sample is measured by subtracting the mass of the first cylinder from the total mass of the first cylinder plus dry second substrate. The sample is then saturated in water for 10 minutes, by submerging the sample and first cylinder in water. The sample and first cylinder are then removed from the water and the sample allowed to drain for 2 minutes and the mass of the sample after this free drainage step measured. A second cylinder having diameter 10 cm and height 9 cm is then provided, also having an open top end and a bottom end provided with metal mesh so as to enable holding of a sample of first substrate but not hinder water transfer. Sufficient of the first growth substrate is then provided to fill the second cylinder to the top. The mass of this sample is established as the difference between the mass of the empty second cylinder and the mass of the filled second cylinder. The second cylinder containing the sample of first growth substrate is then placed on top of the sample of second substrate so that the two cylinders are aligned and coaxial. The samples are left in place for 10 minutes and then separated. The mass of the second substrate is then obtained.

In cases where the first growth substrate has greater water uptake capacity than the second substrate then a minimum mass $M1$ of water will transfer from the saturated second substrate into the first growth substrate sample. The mass $M1$ of water transferred is the mass $M2$ of the saturated sample of second substrate after free drainage and before positioning in the cylinder minus the final mass $M3$ of the sample of second growth substrate. If any free water remains then the mass $M4$ of this is also subtracted. The total water content of the saturated sample of second substrate is determined by subtracting the original dry mass $M5$ of the sample from the mass $M2$ of the saturated sample prior to contact with the first substrate. The percentage of water which has transferred into the first growth substrate after the defined time period can then be determined as:

$$\text{percentage water transferred is} = [(M2-M3)/(M2-M5)] \times 100\%.$$

The first growth substrate has a greater water uptake capacity than the second substrate if the percentage water transferred is at least 20%. However, in preferred systems the percentage water transferred is at least 30%, preferably at least 50%, more preferably at least 60%, and in particular at least 75%.

The first growth substrate has a first degree of hydrophilicity when dry which is generally relatively low. Degree of hydrophilicity when dry is determined by measurement of sinking time. Sinking time is measured as follows.

The sample to be tested is dry. Generally the water content of the sample is the same as the water content of a sample at the wilting point exhibited by the plant species to be grown. Samples are generally tested in the forms in which they are to be provided to the system before any watering is undertaken. Products are tested in the form of a 75×75×75 mm cube. The sample is placed with a flat surface on the surface of a volume of water and the rate at which the sample sinks into the water is measured. The sinking time is quoted in seconds per cm. If the growth substrate is not integral, for instance if it is in the form of peat, the sinking time is measured on a sample of the above dimensions encased in a mesh. Since a comparison is being made between the first growth substrate and the second substrate, if either substrate must be encased in a mesh then the other substrate is also tested encased in a mesh even if it is itself integral. The mesh is chosen so that it is lightweight and has mesh size low enough to prevent escape of the substrate but high enough to allow passage of the water without significantly influencing the sinking time value.

The second substrate has a second sinking time S2 which is less than S1.

The sinking time of the second substrate is preferably not more than 60 s/cm, more preferably not more than 30 s/cm, most preferably not more than 10 s/cm. The sinking time S2 of the first growth substrate is often as much as 120 s/cm, and even as high as 240 s/cm or 300 s/cm or even higher.

Suitable first growth substrates include peat, coir, soil and compost. The first growth substrate may be a mixture of materials, and may in particular be a mixture of peat, coir, soil and/or compost with up to 25% by volume of additive materials such as mineral wool, perlite, polystyrene, expanded clay, pumice, granulated lava, stone, in particular in amounts of up to 25% by volume of the first growth substrate. Preferably the first growth substrate comprises peat and more preferably includes at least 60%, most preferably at least 75% peat.

The second substrate may be polyurethane foam (eg as sold under the name Oasis), perlite, volcanic stone, expanded clay, vermiculite or sand but in the invention preferably it is mineral wool, preferably as described in more detail below.

The mineral wool (or other second growth substrate) may be provided with additives such as surfactants in order to increase the hydrophilicity of the substrate. The mineral wool is preferably bonded with a binder in conventional manner. Preferably the binder is hydrophilic and most preferably it is a furan binder, preferably of the type described in EP-A-849987. The advantage of such binders is that they provide hydrophilicity to the substrate but are not washed out during the cycle of wetting and drying and maintain hydrophilicity.

The first growth substrate and second substrate are arranged so that they are in fluid communication but the second substrate is discrete from the first growth substrate. That is, if the plants are grown in pots the first growth substrate and second substrate are in discrete sections. For instance, they may be in two layers. A disc of the second substrate may be provided at the base of the pot. Other structures may however be envisaged. For instance, the second substrate may be provided as a lining over the entire inner surface of the pot.

The first growth substrate and second substrate are generally in direct contact but in some circumstances it can be preferred to provide a barrier layer between them this can be advantageous if it is desired to prevent movement of particulate matter between the two substrates. In particular it can be desirable to prevent transfer of particles of peat or coir, when used as the first growth substrate, into the second substrate.

When a barrier layer is used this is chosen to be of a material and thickness such that it does not significantly affect water transport between the two layers. This can be tested by subjecting the second substrate and first growth substrate to the test for a relative water uptake capacity discussed above, whilst positioning a layer of the proposed barrier material, having the proposed thickness for eventual use, between the substrates in the test cylinder. The percentage water transferred should not vary by more than 15% (based on the total amount of water transferred between the systems) with and without the proposed barrier layer.

Suitable barrier layer materials include a mesh or fleece of organic or inorganic fibres.

The second substrate may be a mixture of materials, eg a mixture of granular mineral wool and clay, but is preferably a single material, in particular mineral wool. Although the first growth substrate may also be a mixture of materials, eg a mixture of peat and coir or peat and clay, the first and second substrates are of course different.

Generally the first growth substrate and second substrate are provided in a container, generally a pot. Pots generally contain only a single plant. Preferably the first growth substrate and second substrate are arranged in a pot (or other container) so that the second substrate is at the base of the pot (or other container). Pots for growing pot plants commonly have apertures in their base. Plants grown under standard conditions have a tendency for the roots to grow out through these apertures and sometimes into the base material on which the pots are standing. This is generally undesirable and can lead to root damage when the plants are moved. In the invention it is preferred that the second substrate forms a barrier between the first growth substrate and such apertures. Because the second substrate has a lower water uptake capacity than the first growth substrate, after flooding water will move from the second substrate into the first growth substrate so that for the majority of the growth period the second substrate will be significantly drier than the first growth substrate. As a result, tendency for the roots to grow into the second substrate is minimised, consequently minimising growth out of the pot and improving root pruning.

Such a system also reduces the risk of root diseases. After sale, pot plants are commonly positioned in a saucer or dish which is filled with water intended to be transported into the growth substrate through the apertures. Roots at the base of the pot tend to become drowned when such a system is used and are subject to root diseases. The system of the invention, which minimises root growth towards the bottom of the pot, minimises this risk.

The precise watering strategy depends upon the plant and the time of year and other prevailing conditions. In the invention the second substrate is flooded with water at intervals, generally regular intervals. The invention is particularly useful where the plants are to be subjected to drought stress.

Generally the application of drought stress requires periodic flooding of the second substrate for a brief period of time followed by failing to supply further water even when the amount remaining is below the plant's requirements.

During flooding it is essential that water is applied to the second substrate. Generally no water is applied to the first growth substrate during the flooding stage.

Flooding generally lasts not more than 2 minutes, preferably not more than 1 minute. It generally lasts at least 20 seconds. It is desirable that the flooding stage does not last for so long that water begins to be transferred from the second substrate to the first-growth substrate, since under these circumstances the variable hydrophilicity of the first growth substrate in different pots begins to affect water uptake.

Flooding may be carried out in any suitable manner. For instance, in one embodiment where the second substrate is a sand bed on which pots containing the first growth substrate are positioned, flooding may be carried out by flooding the sand bed for a defined period of time. This system is particularly beneficial when the plants are grown in the open air. The sand bed can be on the ground.

For instance, pots containing growing plants may stand on a table or other surface having channels below the pots. Flooding is carried out by allowing the entry of water into the channels through a valve. Water is allowed to rise to a defined level, is held for a certain time and then allowed to drain.

In a preferred embodiment a layer of mineral wool placed in the base of each pot as the second substance and a preferred system involves placing the pots on a surface which is vertically moveable and through which water may pass. For flooding the surface is lowered into a container such as a tank of water and when flooding is complete the vertically moveable surface is removed from the water. Since the layer in each pot can easily be provided with a predetermined volume (with all pots of the same size preferably being provided with the same volume) of mineral wool it is possible to ensure that the amount of water taken up by each pot during flooding is substantially uniform. Thus preferably the layer of mineral wool in each pot is provided by cutting an appropriate area out of a larger layer or batt of suitable mineral wool. This system has the advantage that all pots are contacted with water at the same time and so the time of exposure to water is the same for all pots.

When drought stress is applied, after flooding the plants are then not supplied with water until a point at which it is observed that the water level is below the requirements of the plants to a predetermined degree. This may be measured in any suitable manner. It may be carried out simply by observation of wilting. For instance, growers are able to determined the temporary wilting point of a plant, a point when there is no water available in the first growth substrate which the plants are able to utilise and so wilting occurs. However, plants are able to recover when water is supplied to the soil again. Alternatively, water level in the individual pots may be measured, for instance by monitoring the mass of the pots, by means of a water content meter, by visual observation or by combinations of these means. It is possible to measure and use absolute water content and water content gradient (rate of change).

The total time for which plants are subjected to drought stress, the number of flooding/water deprivation cycles etc depends upon the plant and the prevailing conditions. Suitable growth periods include from 12 to 18 weeks, although this does vary with species. Generally plants are grown to a predetermined size prior to application of drought stress conditions.

Alternatively, or in addition to, application of drought stress conditions, during growth the plant may be subjected to nutrition stress, for instance periodic deprivation of phosphate, nitrogen and other nutrients. Such nutrients are generally fed to the plant in the irrigation water. Application of nutrition stress as a means of increasing resistance of the plants to deprivation of nutrients after they have left the grower is known. As with drought stress, the invention provides a convenient, controlled and efficient manner of applying nutrition stress to a large number of pot plants at the same time. Application of nutrition stress is particularly beneficial in combination with drought stress because plants will be deprived of both water and the defined nutrients at the same time. Thus they will signal earlier that there is a deficiency in both and the risk that the plants will be over stressed and wilting become permanent will be reduced.

In the invention the second substrate is preferably mineral wool. We find that the density of the mineral wool influences the relevant properties of the wool and should be from 40 to 100 kg/m$^3$. Higher density can lead to higher water uptake capacity. It also tends to decrease sinking time values and values above 100 kg/m$^3$ are therefore, generally less effective. The density can be chosen within the 40 to 100 kg/m$^3$ range so as to provide an optimum balance between the water uptake capacity and sinking time values of the second substrate and the first growth substrate.

We also find that higher density can have the advantage over lower density that water retention after initial uptake is greater, thus allowing a greater time for water transfer from the second substrate to the first growth substrate after flooding.

Density is generally at least 50 kg/m$^3$, preferably from 50 to 80 kg/m$^3$, with 60 to 65 kg/m$^3$ being optimum, especially in combination with a peat first growth substrate.

The layer is usually has a thickness of at least 0.5 cm, e.g., 0.7 to 5 cm, often 0.5 to 2 cm.

We find that use of finer fibres tends to increase the initial water retention after flooding and the water uptake capacity. The fibres preferably have a median diameter in the range 2 to 10 microns, preferably 3 to 8 microns, most preferably 3 to 4 microns. Fibre diameter can be determined as disclosed in DK-A-98/00943.

We find that the orientation of the fibres in a mineral wool second substrate can be influential on the water uptake capacity and sinking time properties of the second substrate.

The mineral wool second substrate should be preferably arranged so that the fibres are substantially horizontal, i.e., so that visually the predominant orientation appears substantially horizontal. The "vertical" direction is of course the direction of gravity in which the plant grows. This preference for horizontal orientation is because we have found that the second substrate tends to hold taken-up water better after flooding when the fibres are horizontal. However, a certain degree of vertical orientation can be desirable in order to reduce sinking time and thus increase hydrophilicity when dry.

The layer of mineral wool can be made by a standard method of producing a mineral wool web, with the eventual horizontal direction being the direction parallel to the conveyer during the normal lay-down process.

Thus it can be seen that by selecting the various properties of mineral wool as the second substrate it is possible to optimise sinking time values, water uptake capacity and initial retention of flooding water so that optimum properties relative to the first growth substrate chosen can be obtained.

A preferred pot or other plant growth environment comprise peat or other first growth substrate and beneath, but in fluid communication with the first substrate, a layer of mineral wool of density 40 to 100 kg/m$^3$ and which is bonded and is hydrophilic.

Arrangements which may be used in the invention are illustrated in the Figures, as follows.

Figure 1:
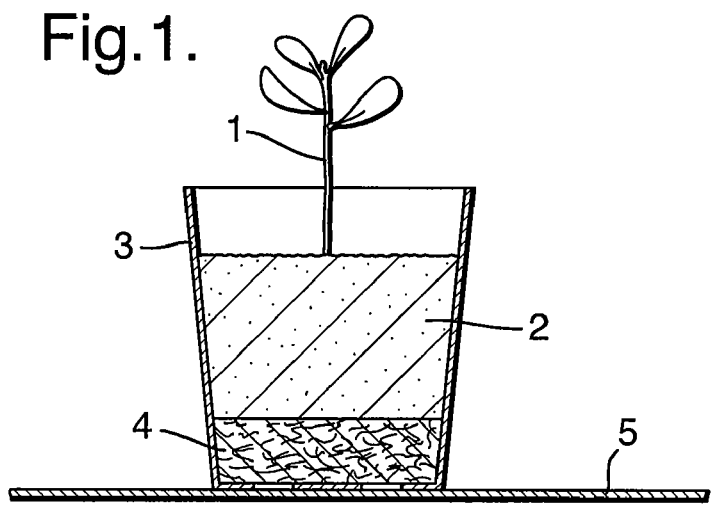
FIG. 1 shows a single pot suitable for use in the invention.

In FIG. 1 the plant 1 is grown in a peat substrate 2 in a pot 3. At the base of the pot is placed a disc 4 of mineral wool. The pot is placed on a vertically moveable surface 5. For flooding, the vertically moveable surface 5 is lowered into a tank of water (not shown) so that the top surface of the disc of mineral wool 4 coincides with the surface of the water and the disc 4 is thus entirely submerged in the water, but none of the peat 2 is submerged. After a predetermined time the vertically moveable surface 5 is raised out of the tank of water.

Figure 2:
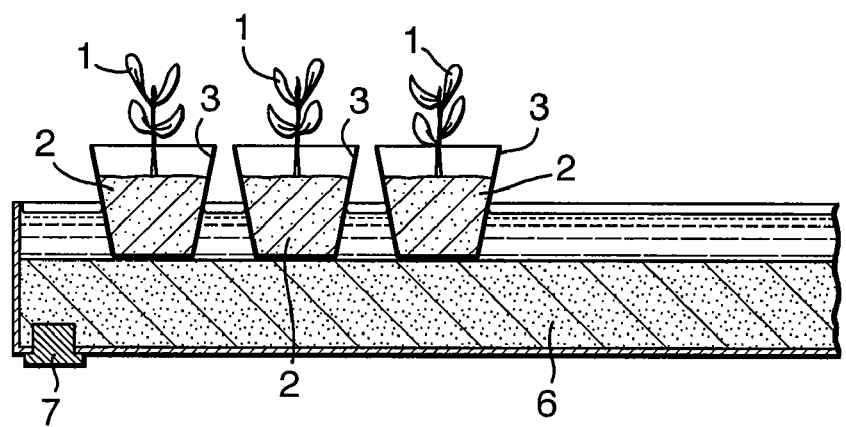
FIG. 2 shows a series of pots arranged for use in the invention.

An alternative embodiment is shown in FIG. 2 in which plants 1 are each grown in a peat substrate 2 in pots 3. These pots are placed on a sand bed 6. In this embodiment the peat 2 forms the first growth substrate, as in FIG. 1, and the second substrate is formed by the sand bed. For the flooding stage the sand bed is flooded with water for a predetermined period of time. Drainage of the sand bed can be carried out actively via the plug 7 inserted in the sand bed. Suitable systems for inducing drainage actively are described in our copending international patent application no. PCT/EP 02/07741.

Figure 3:
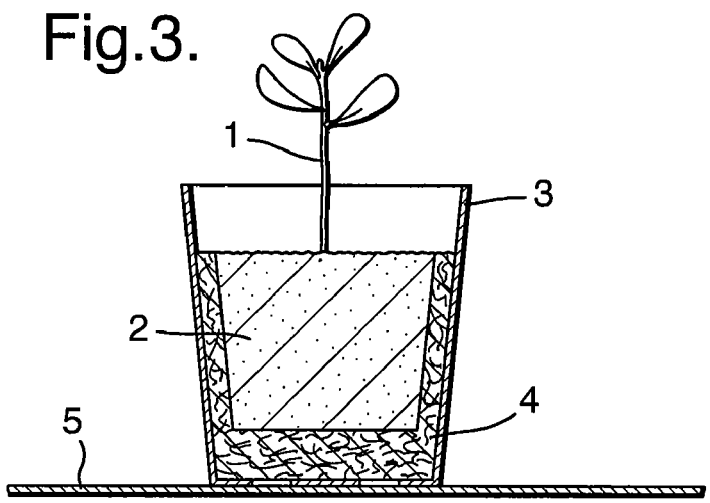
FIG. 3 shows an alternative embodiment.

FIG. 3 shows a further embodiment in which the plant 1 is grow in a peat substrate 2 in a pot 3. The second substrate 4 is mineral wool. The pot is placed on a vertically movable surface 5 in FIG. 1. The second substrate 4 is configured so that it acts as a lining to the pot 3 and is thus in the form of an "inner pot" of mineral wool. Such a system allows transfer of water from the mineral wool second substrate to the peat first growth substrate through the sides of the first growth substrate as well as the base. In addition, due to the larger volume of the second substrate a larger volume of water can be taken up during the flooding stage. The system can also improve the consistency of the conditions in the first growth substrate due to the insulation properties of the mineral wool surrounding the peat first growth substrate.

The invention will now be illustrated with reference to the following example.

EXAMPLE

A process of the invention can be carried out as follows.

Pot roses are grown in 10 cm pots in which the first substrate is peat. The second substrate is a disc of mineral wool having thickness 1 cm and diameter 10 cm. The fibres are substantially horizontal and the density is 60 kg/m$^3$ and the mineral wool is bonded, with a furan binder.

15 pots of this type are placed in a tray whose base is in the form of a grid. For the flooding stage the tray containing the pots is lowered into a nutrition liquid which is water containing dissolved nutrients so that the pots are submerged to a depth such that the mineral wool disc is wholly underwater. The tray and pots are left in position for 20 secs and then removed from the nutrition liquid.

The water content is measured with a water content meter until the water content in the peat is 30%. The flooding is then repeated. This process is repeated for the duration of the period for which the roses are subjected to drought stress.

The invention claimed is:

1. A method of growing at least one plant, the method comprising positioning the at least one plant for growth in a first growth substrate which has a first water uptake capacity and a first sinking time with the first growth substrate in fluid communication with a discrete second substrate; wherein the second substrate is mineral wool having a density of 40 to 100 kg/m3, a second water uptake capacity which is less than the first water uptake capacity and a second sinking time; wherein the value of the first sinking time is greater than the value of the second sinking time, and flooding the second substrate with water during intervals; wherein the plant is grown under conditions of drought stress.

2. The method according to claim 1 in which the mineral wool has density in the range 50 to 80 kg/m$^3$.

3. The method according to claim 2 in which the mineral wool has density in the range 55 to 65 kg/m$^3$.

4. The method according to claim 1 in which fibres of the mineral wool have median thickness of 2 to 10 microns.

5. The method according to claim 4 in which fibres of the mineral wool have medium thickness of 3 to 8 microns.

6. The method according to claim 1 in which fibres of the mineral wool fibres have a substantially horizontal orientation.

7. The method according to claim 1 in which the mineral wool is bonded with a hydrophilic binder.

8. The method according to claim 1 in which the first growth substrate comprises peat, coir, soil and compost.

9. The method according to claim 8 in which the first growth substrate comprises peat.

10. The method according to claim 1 wherein at least 10 plants are grown, each in a pot having a base having apertures and the second substrate is a layer of mineral wool which is contained in the pot and forms a barrier between the first growth substrate and the apertures.

11. The method according to claim 1 wherein at least 10 plants are grown, each grown in a pot containing the first growth substrate in fluid communication with the mineral wool and in which the same volume of water is taken up by the mineral wool in each pot and the layer of mineral wool in each pot of the same size has the same area and volume.

12. A plant growth environment comprising a first growth substrate which has a first water uptake capacity and a first sinking time, with the first growth substrate being in fluid communication with a discrete second substrate, wherein the second substrate is mineral wool having a density of 40 to 100 kg/m$^3$, a second water uptake capacity which is less than the first water uptake capacity, and a second sinking time; wherein the the first sinking time is greater than the second sinking time.

13. A method of growing at least 10 plants, the method comprising positioning each plant for growth in a first growth substrate which has a first water uptake capacity and a first sinking time with the first growth substrate in fluid communication with a discrete second substrate; wherein the second substrate is mineral wool having a density of 50 to 80 kg/m3, a second water uptake capacity which is less than the first water uptake capacity and a second sinking time; wherein the value of the first sinking time is greater than the value of the second sinking time, and flooding the second substrate with water during intervals; such that the plants are grown under conditions of drought stress.

14. The method of claim 13 in which the first growth substrate is peat.

15. The method of claim 13 in which each plant is in a pot having a base having apertures and the second substrate is a layer of mineral wool which is contained in the pot and forms a barrier between the first growth substrate and the apertures.

16. The method of claim 13 in which each plant is grown in a pot containing the first growth substrate in fluid communication with the mineral wool and in which the same volume of water is taken up by the mineral wool in each pot and the layer of mineral wool in each pot of the same size has the same area and volume.

* * * * *